United States Patent
Williamson et al.

(10) Patent No.: US 7,233,770 B2
(45) Date of Patent: Jun. 19, 2007

(54) COMMUNICATIONS SYSTEM USING SEPARATE RECEIVE AND TRANSMIT FREQUENCY HOPPING HOPSETS

(75) Inventors: Robert Williamson, Earby (GB); David M. Bicksler, Webster, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/074,357

(22) Filed: Mar. 7, 2005

(65) Prior Publication Data
US 2006/0199531 A1 Sep. 7, 2006

(51) Int. Cl.
H04B 7/14 (2006.01)
H04B 7/15 (2006.01)
H04B 3/36 (2006.01)

(52) U.S. Cl. .......................... 455/7; 455/11.1; 455/16; 375/211

(58) Field of Classification Search .............. 455/11.1, 455/7, 8, 16, 10; 375/211, 492
See application file for complete search history.

(56) References Cited

U.S. PATENT DOCUMENTS

| | | | |
|---|---|---|---|
| 4,701,935 A * | 10/1987 | Namiki ..................... 375/214 |
| 5,479,400 A * | 12/1995 | Dilworth et al. ............ 370/331 |
| 5,621,798 A * | 4/1997 | Aucsmith .................... 380/271 |
| 5,659,879 A * | 8/1997 | Dupuy ......................... 455/15 |
| 5,722,059 A | 2/1998 | Campana, Jr. ........... 455/226.2 |
| 5,875,179 A | 2/1999 | Tikalsky ..................... 370/315 |
| 6,005,884 A | 12/1999 | Cook et al. ................. 375/202 |
| 6,108,364 A * | 8/2000 | Weaver et al. ............. 375/130 |
| 6,169,485 B1 | 1/2001 | Campana, Jr. ........... 340/573.4 |
| 6,337,628 B2 | 1/2002 | Campana, Jr. ........... 340/573.4 |
| 6,353,729 B1 * | 3/2002 | Bassirat ..................... 455/11.1 |
| 6,373,833 B1 * | 4/2002 | Suonvieri et al. ........... 370/347 |
| 6,501,955 B1 | 12/2002 | Durrant et al. ............. 455/456 |
| 6,735,630 B1 | 5/2004 | Gelvin et al. ............... 709/224 |
| 6,804,491 B1 * | 10/2004 | Uesugi ...................... 455/11.1 |
| 6,925,069 B2 * | 8/2005 | Koos et al. ................. 370/334 |
| 7,113,745 B2 * | 9/2006 | Khayrallah ................. 455/41.2 |
| 2001/0000959 A1 | 5/2001 | Campana, Jr. ........... 340/573.1 |
| 2004/0097227 A1 * | 5/2004 | Siegel ......................... 455/431 |
| 2004/0266340 A1 * | 12/2004 | Ivanov et al. .............. 455/11.1 |

* cited by examiner

*Primary Examiner*—Tilahun Gesesse
(74) *Attorney, Agent, or Firm*—Allen, Dyer, Doppelt, Milbrath & Gilchrist, P.A.

(57) ABSTRACT

A system communicates with a mobile radio and includes a repeater that is operative for transmitting and receiving communications signals on respective first and second frequency hopping hopset. A mobile radio receives a communication signal from the repeater on the first frequency hopping hopset and transmits a communication signal to the repeater on the second frequency hopping hopset.

24 Claims, 6 Drawing Sheets

NUMBER OF RADIO PATHS TO BE SATISFIED FOR ALL-INFORMED COMMUNICATIONS ON A SINGLE FREQUENCY SIMPLEX RADIO NET
$= (N^2-N)/2$
(WHERE N IS THE NUMBER OF OUT STATIONS)

14 NET MEMBERS OF A SINGLE FREQUENCY SIMPLEX NET REQUIRES 91 RADIO PATHS TO WORK FOR ALL INFORMED COMMUNICATIONS

FIG. 4

NUMBER OF RADIO PATHS TO BE SATISFIED FOR ALL-INFORMED COMMUNICATIONS ON A TWO FREQUENCY SIMPLEX RADIO NET
$= N$
(WHERE N IS THE NUMBER OF OUT STATIONS)

14 NET MEMBERS OF A TWO FREQUENCY SIMPLEX NET REQUIRES ONLY 14 RADIO PATHS TO WORK FOR ALL INFORMED COMMUNICATIONS

COMMUNICATIONS SYSTEM USING SEPARATE RECEIVE AND TRANSMIT FREQUENCY HOPPING HOPSETS

FIELD OF THE INVENTION

The present invention relates to the field of communications systems, and more particularly, this invention relates to wireless communications systems that use repeaters to communicate between mobile radios.

BACKGROUND OF THE INVENTION

There are many different techniques for extending the range of mobile radios, typically used in high frequency (HF), very high frequency (VHF), and sometimes ultra-high frequency (UHF) wireless communications. Examples of such mobile radios include the various devices manufactured by the assignee of the present invention, Harris Corporation of Melbourne, Fla., including the tactical mobile radios sold under the designation Falcon® II radios that are often manufactured as a multiband manpack or a handheld. These mobile radios are used in the field and often are combat net radios (CNR) operative in a communications network, such as an Integrated Tactical Area Network System (ITACS), which provides secure voice, data and video services to tactical users, using IP data and VOIP voice processing and other network benefits. One technique to extend the range of networked mobile radios includes the use of rebroadcasting stations that split the communications network so that the mobile radio outstations receive some transmissions from the rebroadcast station and other transmissions directly from another mobile radio outstation. It would be more advantageous if the mobile radios communicated directly to a repeater and not to each other, thus reducing the number of possible radio paths.

Many mobile radios currently support two-frequency simplex for use in a repeater mode. In more advanced designs, a mobile radio supports single frequency hopping hopset communications. When a repeater, as contrasted with a rebroadcast station is required, however, frequency hopping cannot be used. For example, different communications networks, such as FalconNet produced by the assignee of the present invention, Harris Corporation, supports wide area communications via repeaters, but does not advantageously use any multiple frequency hopping hopsets in a repeater mode. These networked mobile radios only support frequency hopping using a single frequency hopping hopset. One frequency is selected for frequency hopping and possible locksets to exclude specific frequencies. These mobile radios also use the same frequency hopping hopset for both receive and transmit communications, which limits the usefulness for electronic counter-measures and security.

SUMMARY OF THE INVENTION

It is therefore an object of the present invention to provide a communications system that provides at least two-frequency hopping hopsets for use in mobile radios operating in a repeater mode to extend the range of the mobile radios while providing secure communications.

In accordance with the present invention, a system for communicating with a mobile radio includes a repeater that is operative for transmitting and receiving communications signals on a respective first and second frequency hopping hopset. The mobile radio receives a communications signal from the repeater on the first frequency hopping hopset and transmits a communications signal to the repeater on the second frequency hopping hopset. The mobile radio can comprise one of a handheld or manpack radio. The mobile radio is also operative as a combat net radio (CNR) outstation within a combat net radio communications network.

In one aspect of the present inventions, the mobile radio and repeater are operative for transmitting and receiving communications signals with one of Single-Channel Ground and Airborne System (SINCGARS) or Quicklook frequency hopping protocol. The mobile radio itself can be operative as a repeater, which can include a buffer for buffering communications signals. The mobile radio can also be operative for transmitting communications signals having an identification for another mobile radio, including encrypted data.

In another aspect of the present invention, the plurality of mobile radios are contained within a combat net radio (CNR) communications network and each mobile radio is operative for transmitting and receiving communications signals along different transmit and receive frequency hopping hopsets. The repeater is in communication with the mobile radios contained within the combat net radio communications network and operative for communicating with mobile radios on respective first and second frequency hopping hopsets. Typically, the mobile radios communicate between each other only through the repeater. Another repeater and an interlink located between the repeaters, for example two mobile radios, can be contained within the combat net radio communications network and operative for enlarging the number of frequency hopping hopsets that can be used within the network. A method of the present invention is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously overcomes the disadvantages of using repeaters in a mobile radio communications network that rely only on two-frequency mobile radio outstations, which receive on one frequency and transmit on another frequency to extend the range of outstation mobile radios also referred to as outstations. In the present invention, the mobile radios are operative to support two separate frequency hopping hopsets, e.g., one frequency hopping hopset used for transmitting, and another frequency hopping hopset used for receiving, as a non-limiting example. Additionally, the repeater station receives on one frequency hopping hopset and transmits on the other. This allows repeaters to operate using a desired frequency hopping waveform, for example, SINCGARS and Quicklook. This "Dual Mode Hopping" (DMH) system and method of the present invention offers various advantages, including that of providing protection against both electronic warfare support measures (ESM) and Electronic Counter Measures (ECM), which are often minimal in a two-frequency simplex system and method. The present invention also provides a more secure area communications coverage, while providing less expensive, lower power radios adapted for field use.

The frequency management is simplified because fewer dual-mode frequency hopping repeaters that use dual frequency hopping hopsets are required in comparison to more normal repeater devices that use a single frequency simplex system to cover any geographical area. In the present invention, the voice procedures are simplified and make large radio communications networks easier to manage and control, while providing excellent rural and urban communications capability. The present invention also provides greater flexibility and resilience in comparison to both traditional single frequency simplex and two-frequency simplex communications systems.

The system and method of the invention allows repeater communication with a mobile radio in an improved communications network by receiving within the mobile radio a communications signal that had been transmitted from the repeater on a first frequency hopping hopset. A communications signal is transmitted from the mobile radio to the repeater on a second frequency hopping hopset different from the first frequency hopping hopset. The mobile radio can be any number of different radios considered "mobile," including a handheld or manpack mobile radio operative as a combat net radio outstation in communication with a repeater within a mobile radio communications network. The mobile radio can transmit and receive communications signals on many different frequency hopping waveforms, including one of the Single-Channel Ground and Airborne System (SINCGARS) or Quicklook frequency hopping protocol. The repeater can also be operative as a mobile radio, and identification of a mobile radio can be communicated via the communications signal for identifying another mobile radio as part of a Directed Calling (DC) system. The communications signal could also be buffered within a mobile radio that is operative as a repeater, to allow repeater functionality in the more limited functions of a mobile radio, especially a handheld unit. It is also possible to encrypt data within the communications signal.

Many mobile radios, for example, some mobile radios manufactured by Harris Corporation of Melbourne, Fla., currently support two-frequency simplex communications for use in repeater mode, but do not support two-frequency hopping hopset repeater mode, i.e., Dual Mode Hopping (DMH), using separate frequency hopping hopsets in respective transmit and receive modes. These mobile radios, however, support a single frequency hopping hopset only. As a result when a repeater (as contrasted with a rebroadcast) station is required to extend the range of mobile radios and increase network performance, frequency hopping cannot be used. There are a number of communications networks that provide some capabilities for supporting wide network area communications via repeater stations. The present invention will allow adaptation of those repeaters to frequency hop in wideband, in addition to operating at a fixed frequency. The resulting communications will have the advantages of transmission security (TRANSEC), including jam resistance and harder-to-detect transmissions. In addition to these benefits, these types of systems commonly used by civilian communications will now be able to provide wide area communications coverage and allow those advantages for military deployments.

As noted before, some prior art mobile radios support frequency hopping using a single frequency hopping hopset. Certain frequencies are selected for frequency hopping, and a lockset chosen to exclude specific frequencies. Currently, these mobile radios use the same frequency hopping hopset for both receive and transmit. The present invention, on the other hand, allows separate frequency hopping hopsets for the respective receive and transmit functions within mobile radio outstations. As a result, a repeater receiving on one frequency hopping hopset and transmitting on another frequency hopping hopset can extend the range of the dual-mode frequency hopping outstation mobile radios.

Figure 4:
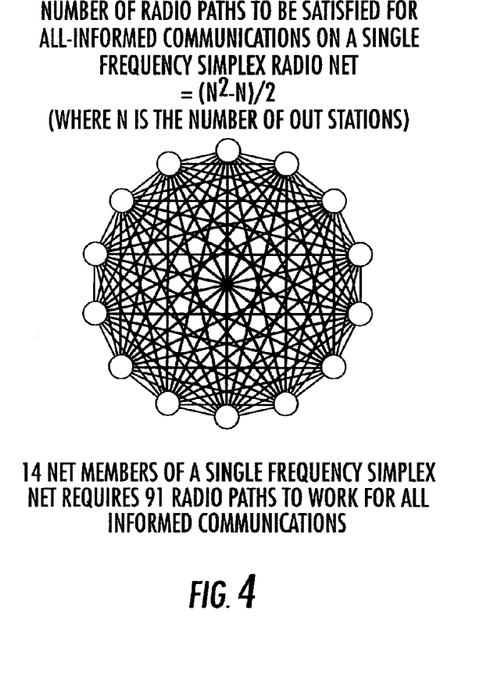
FIG. 4 is a diagram showing a number of radio paths on a prior art single frequency hopping hopset, simplex radio network.
Figure 5:
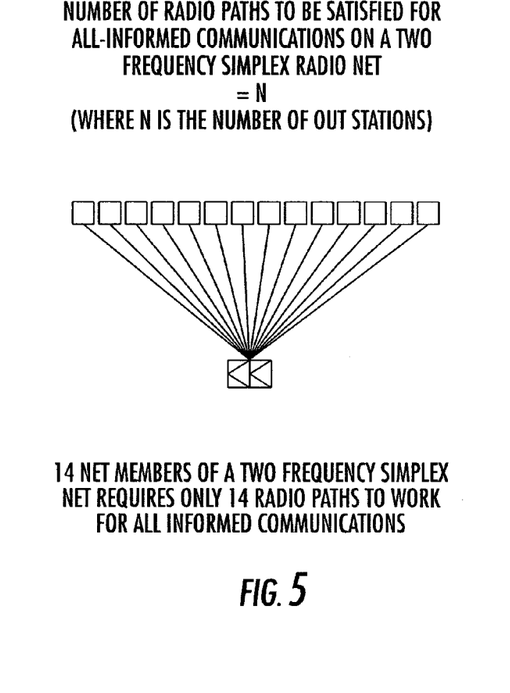
FIG. 5 is a diagram showing the reduced number of radio paths satisfied on a two-frequency hopping hopset, simplex radio net in accordance with the present invention.

When all outstation mobile radios receive on one frequency hopping hopset and transmit on another, all transmissions go to the repeater and all receptions come from the repeater. This reduces the number of radio paths for all outstation mobile radios that are part of a conversation from $(N^2-N)/2$ to N as compared with N separate outstation radios communicating without a repeater. This is best shown in FIGS. 4 and 5, which disclose the number of radio paths for a simple one-frequency hopping hopset simplex communications system (FIG. 4) versus two-frequency hopping hopset simplex system using a repeater (FIG. 5). This reduction of radio paths and the use of a well-placed higher power repeater greatly enhances the ability for all mobile radio outstations to be part of the conversation and increases considerably the geographical area of coverage in comparison to the normal military technique of deploying rebroadcast stations.

The present invention also provides the same capabilities as dual fixed frequency repeaters with EPM protection against ESM and ECM gained from frequency hopping waveforms. Frequency hopping repeaters are far less susceptible to being jammed or disrupted by unauthorized people. The frequencies used by a fixed frequency repeater can be easily detected and unauthorized users can readily access the communications network. A receiver that uses a frequency hopping hopset signal will not receive and will not be activated by a transmission unless it is transmitted on the intended frequency hopping hopset. It is therefore not susceptible to disruption by unauthorized users. Frequency hopping repeaters permit all mobile radio outstations to receive from the higher power repeater, while sending all transmissions to the repeater that may have its antenna on a high tower or hill. This configuration significantly improves the chance of all mobile radio outstations being able to participate in a conversation as compared to a rebroadcast system. As noted before, this reduces the number of radio paths between outstations from $(N^2-N)/2$ to N.

The system and method of the invention can use plain text (PT) or Citadel encryption (CT). Any cryptography can be exportable Citadel or Type-1 encryption. If cryptography is used, it adds COMSEC (Communications Security) to TRANSEC (Transmission Security). Dual frequency hopping hopset repeaters can retransmit voice, data, or mixed transmission with TRANSEC and COMSEC offering the advantages associated with these types of systems. Retransmission of higher-level protocols over frequency hopping waveforms is also supported, for example, Directed Calling and wireless IP, which would be difficult to support in a rebroadcast mode where the retransmitter and original transmitter may compete for frequencies. The hopping repeater configuration allows clear separation between any receive and transmit communications when there is a chance of a radio frequency (RF) collision.

The use of dual-mode frequency hopping hopset mobile radios and repeaters will provide greater multipath resilience in comparison to two-frequency simplex in both rural and urban environments. The use of dual-mode frequency hopping hopsets will reduce the amount of frequencies required for any given deployment, especially in combat net radio communications systems, in comparison to both fixed frequency simplex systems and traditional frequency hopping deployments, both using rebroadcast systems. The use of dual-mode frequency hopping hopsets will simplify voice procedure and make large communications networks more workable in comparison to the single frequency simplex or traditional frequency hopping communications networks currently used in military deployments. Dual-mode frequency hopping hopsets can produce considerable financial saving in the procurement of military radio equipment as low power user radios can be used to the dual mode hopping repeaters without loss of range or coverage.

It is well known that repeater networks typically use mobile radios as outstation mobile radios that can operate with separate receive and transmit frequencies. The present invention offers advantages over this more conventional prior art system and uses separate frequency hopping hopsets in respective transmit and receive modes to reduce the number of radio paths and permit low-power mobile radio outstations to communicate over a wide range through higher power repeaters mounted on towers or mountains (or hills) with high-gain antennas, wile providing the opportunity for enhanced security. All transmissions pass through the repeater and are retransmitted to other mobile radio outstations. These mobile radios never communicate directly with each other. This reduces the number of radio paths and simplifies voice procedure and network discipline.

Figure 6:
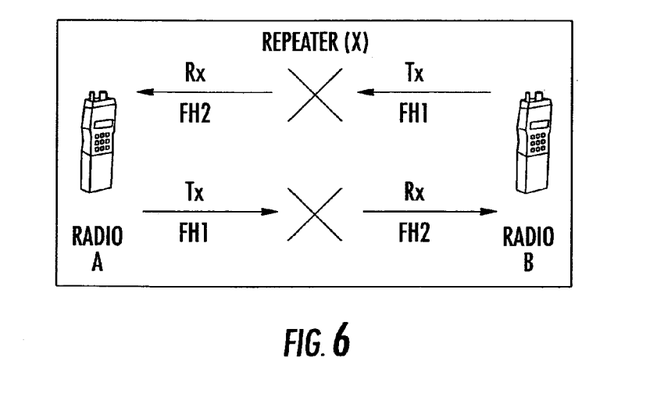
FIG. 6 is a diagram showing two-frequency hopping hopset simplex radios that use separate transmit and receive frequency hopping hopsets.

As noted before, FIGS. 4 and 5 show the reduction of radio paths using a repeater when compared with N separate mobile radio outstations on a single fixed frequency or frequency hopset. The mobile radios can be configured to work with the repeater (x) as shown in FIG. 6, in which mobile radios A and B transmit communications signals on a first frequency hopping hopset (FH1) and receive communications signals on a second frequency hopping hopset (FH2). The repeater (X) receives on the first frequency hopping hopset (FH1) and transmits on the second frequency hopping hopset (FH2).

Figure 7:
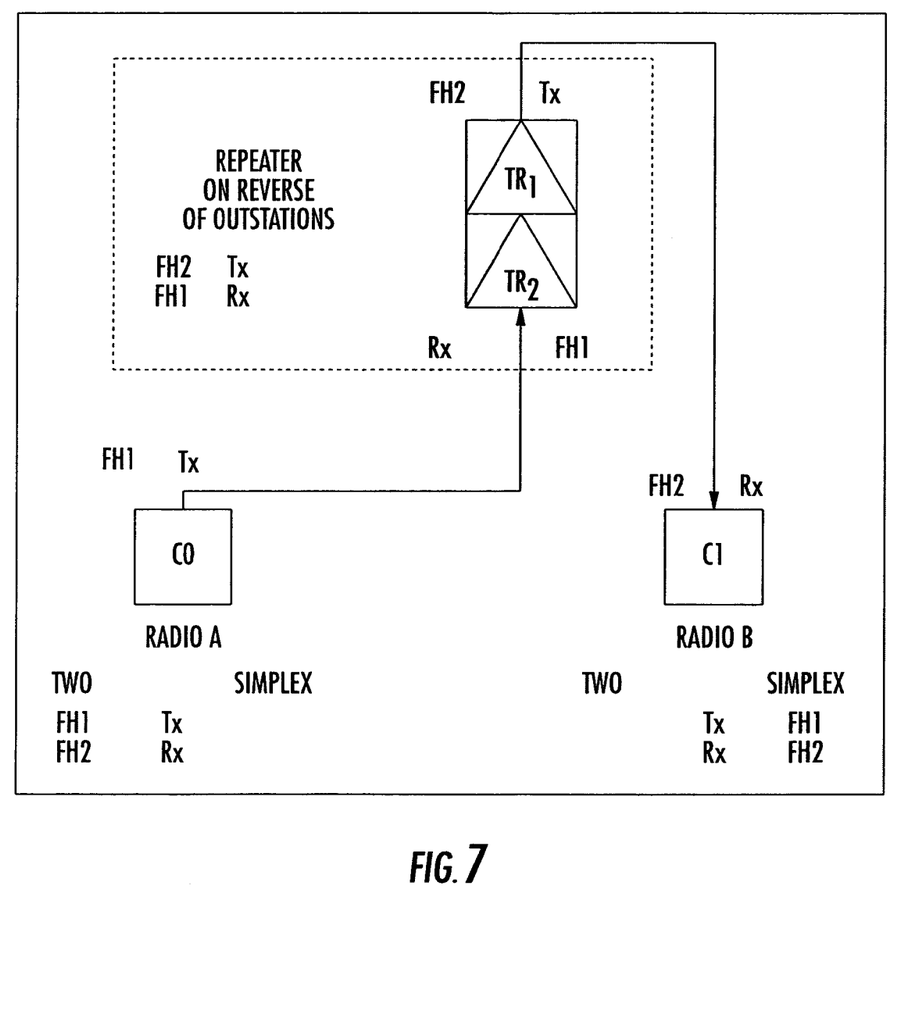
FIG. 7 is a block diagram showing a communications system using a two-frequency hopping hopset simplex repeater in a VHF, UHF, multiband or cross-band operation.
Figure 8:
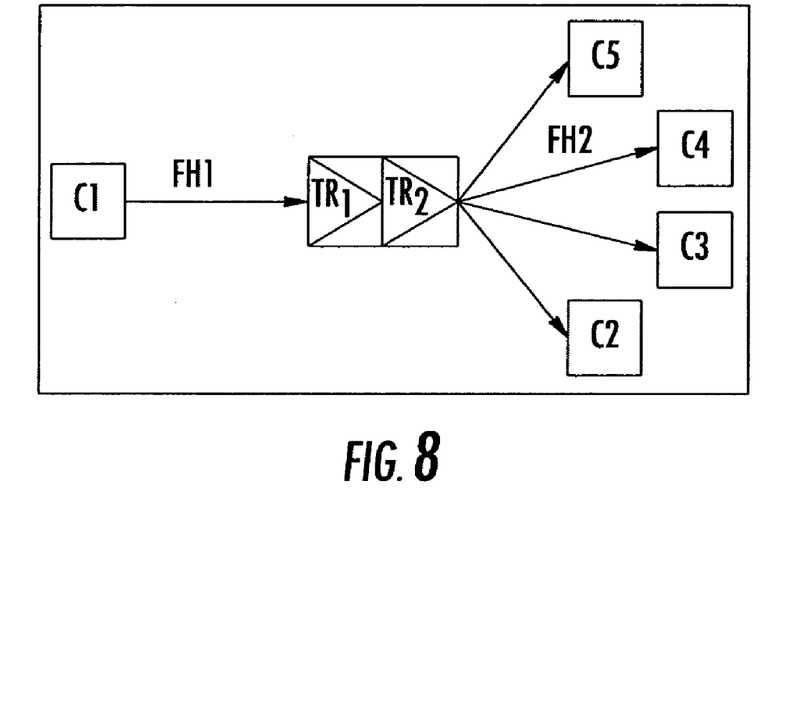
FIG. 8 is a block diagram showing a communications system having improved range by using a repeater.
Figure 9:
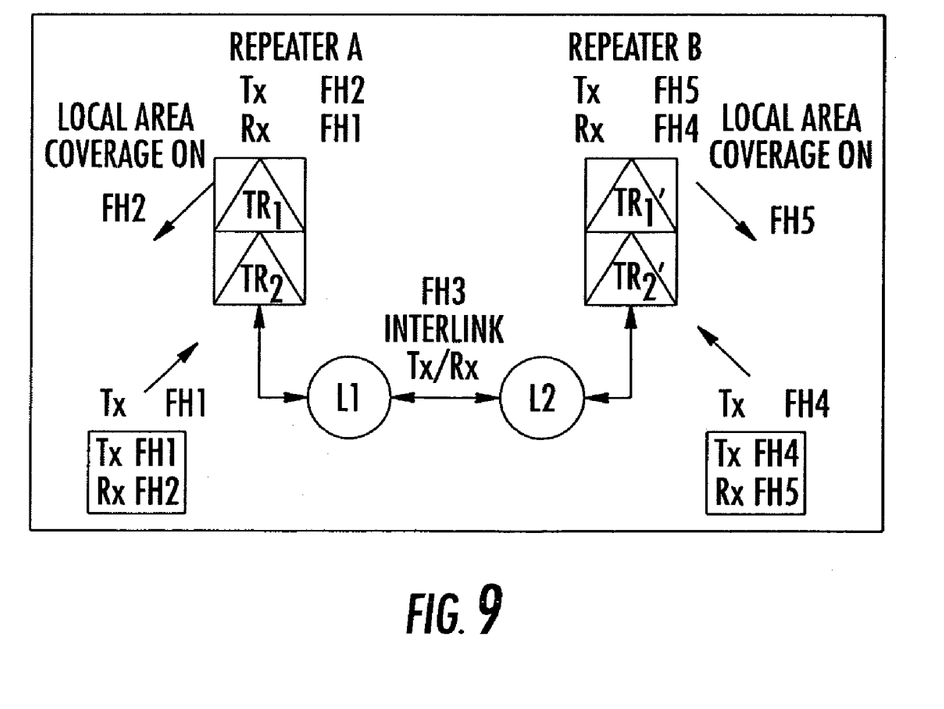
FIG. 9 is a block diagram showing a communications system for two mobile radios interlinked using a single frequency hopping hopset simplex communications path between two mobile radios for increasing the range and number of frequency hopping hopsets.

Repeater stations can be configured as shown in FIGS. 7 through 9 to support mobile radio outstations using two or more frequency hopping hopsets as will be explained in detail below. For example, as shown in FIG. 7, communication on a two frequency hopping hopset simplex repeater can be in VHF, UHF, multiband or cross-band operation. The mobile radio communications ranges increase by using a repeater, of course, and two mobile radios can be interlinked using dedicated single frequency hopping hopset simplex radios as shown in FIG. 9, which shows a greater number of different frequency hopping hopsets and two repeaters.

In these examples, the mobile radios can be typically combat net radios (CNR) and operable within a combat net radio communications network, for example, as described below with reference to FIG. 2.

Figure 1:
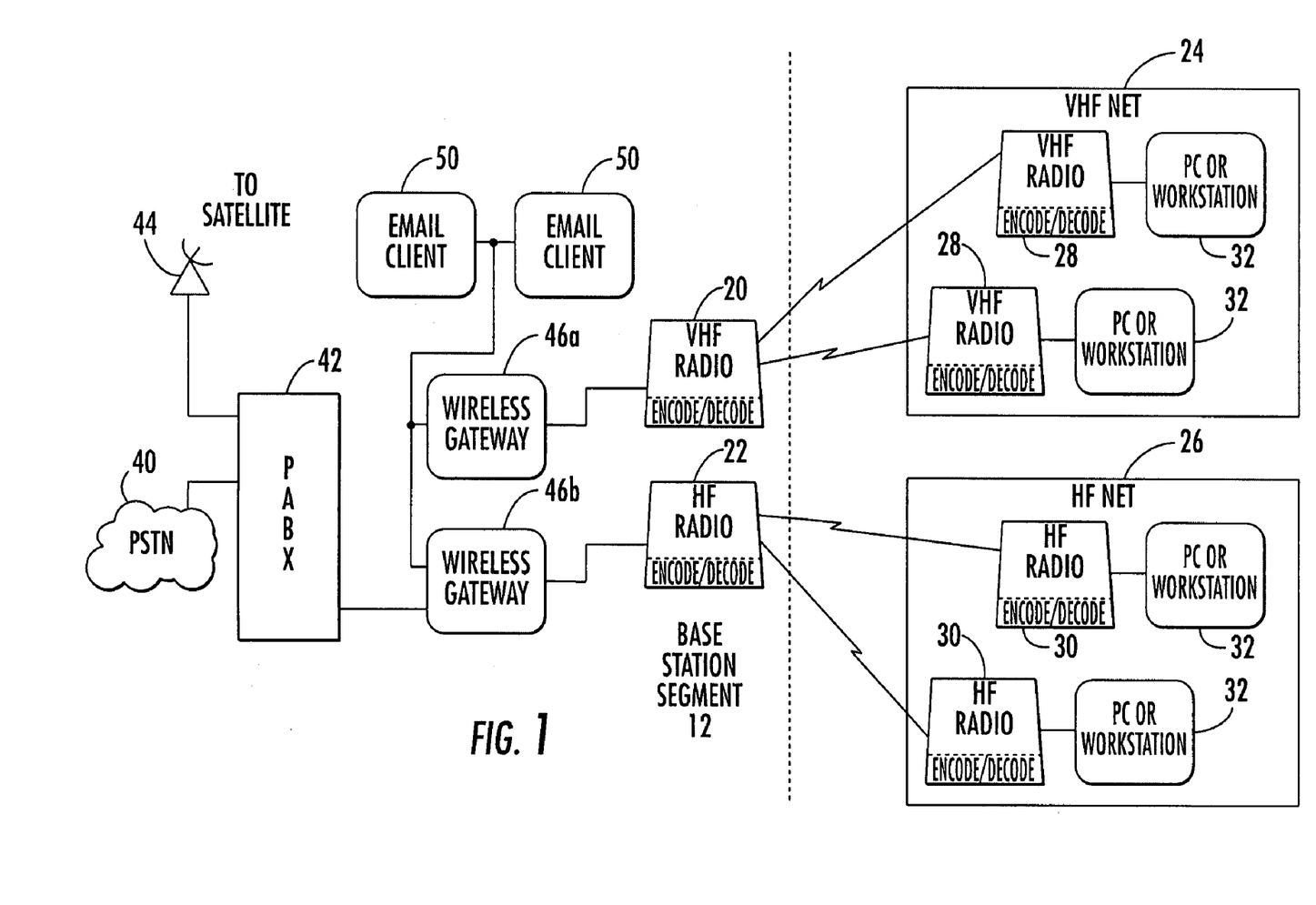
FIG. 1 is a block diagram of a communications system that can be used with the present invention as a non-limiting example.

For purposes of description only, a brief description of the type of communications system that would benefit from the present invention is described relative to a non-limiting example shown in FIG. 1. This high-level block diagram of a communications system 10 includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF mobile radios 28 and HF mobile radios 30, and personal computer workstations 32 connected to the radios 28, 30. The VHF mobile radios can include appropriate decode/encode circuits, a modem, and two transceiver circuits operable at first and second frequency hopping hopsets. Other circuits for interference suppression could be included, and appropriate firmware and hardware operative for the invention. These circuits could operate to perform the functions necessary for the present invention. Other illustrated radios can have similar circuits.

The base station segment 12 includes a landline connection to a public switched telephone network (PSTN) 40, which connects to a PABX 42. A satellite interface 44, such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50. The radios include appropriate signal generators and modulators.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538, the disclosure which is hereby incorporated by reference in its entirety. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538. It is also possible to use a fixed, non-adaptive data rate as high as 19,200 bps with a radio set to ISB mode and an HF modem set to a fixed data rate. It is possible to use co-combining techniques and ARQ.

An example of a tactical mobile radio that can be used and is especially applicable to the present invention with modification is the Falcon® II family of mobile radios that are software-based radios that can include embedded type-1 or other encryption, extended frequency range, advanced data capabilities, and other benefits, including advanced, high-speed modems with automatic voice/data detection and error-free transmission modes. An example of such a mobile radio is a Falcon II AN/PRC-117F(C) sold by Harris Corporation as a multiband manpack radio with NSA-certified, type-1 security module. This mobile radio allows ground-ground, ground-air and ground-satellite communications. It can comply with SINCGARS, Havequick, and UHF TAC-SAT standards, and includes a programmable platform and software upgradeables. The TACSAT operation supports single-channel and Demand-Assigned Multiple-Access (DAMA) modes. Other types of mobile radios can include diplexed antenna outputs for high-gain, band-specific antennas, DC power filtering, a removable keypad/display unit, and Automatic Link Establishment (ALE). One specific VHF radio is the Falcon II RF-5800V very-high-frequency manpack or handheld portable. This advanced digital combat net radio (CNR) includes advanced 64 KBPS data capability that allows other Internet Protocol (IP)-based applications to run in the background of normal voice traffic. It can use Quicklook frequency-hopping algorithms and provide hopping at rates over 300 hops per second. It can use a Citadel encryption scheme to secure communications and include an embedded GPS receiver to provide local position information. This mobile radio can also use a 64-KBPS model with a 10-watt output to extend range for a 30-108 MHz extended frequency range. Secure-channel scanning can be provided with a removable keypad/display unit, automatic whisper operation, secure-channel scanning, and a built-in speaker/microphone. It also can include a power amplifier and be operative with a network access hub, such as the RF-6010 manufactured and distributed by Harris Corporation.

Figure 2:
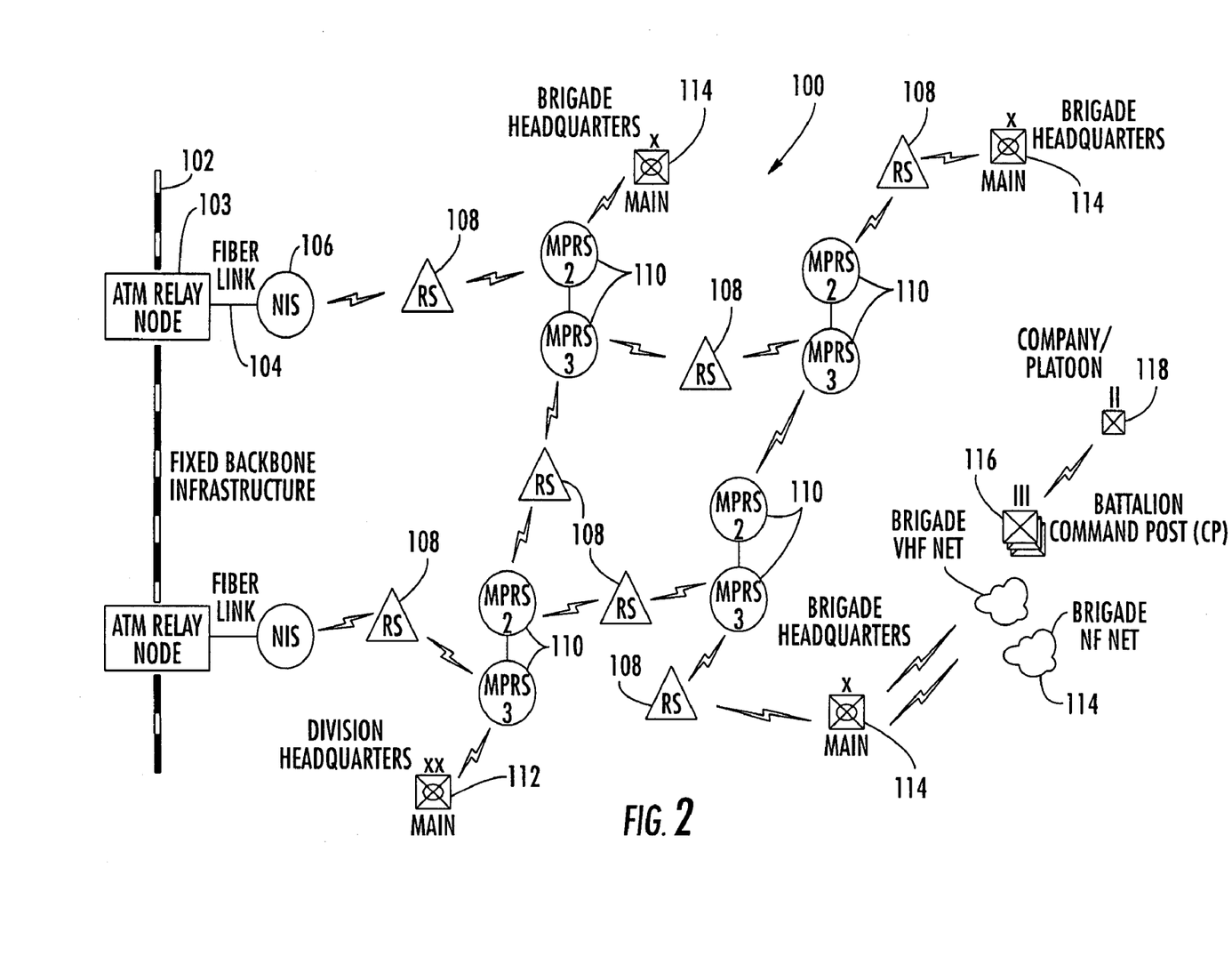
FIG. 2 is a fragmentary, block diagram of an Integrated Tactical Area Network System (ITACS) which can incorporate the system and method of the present invention.
Figure 3:
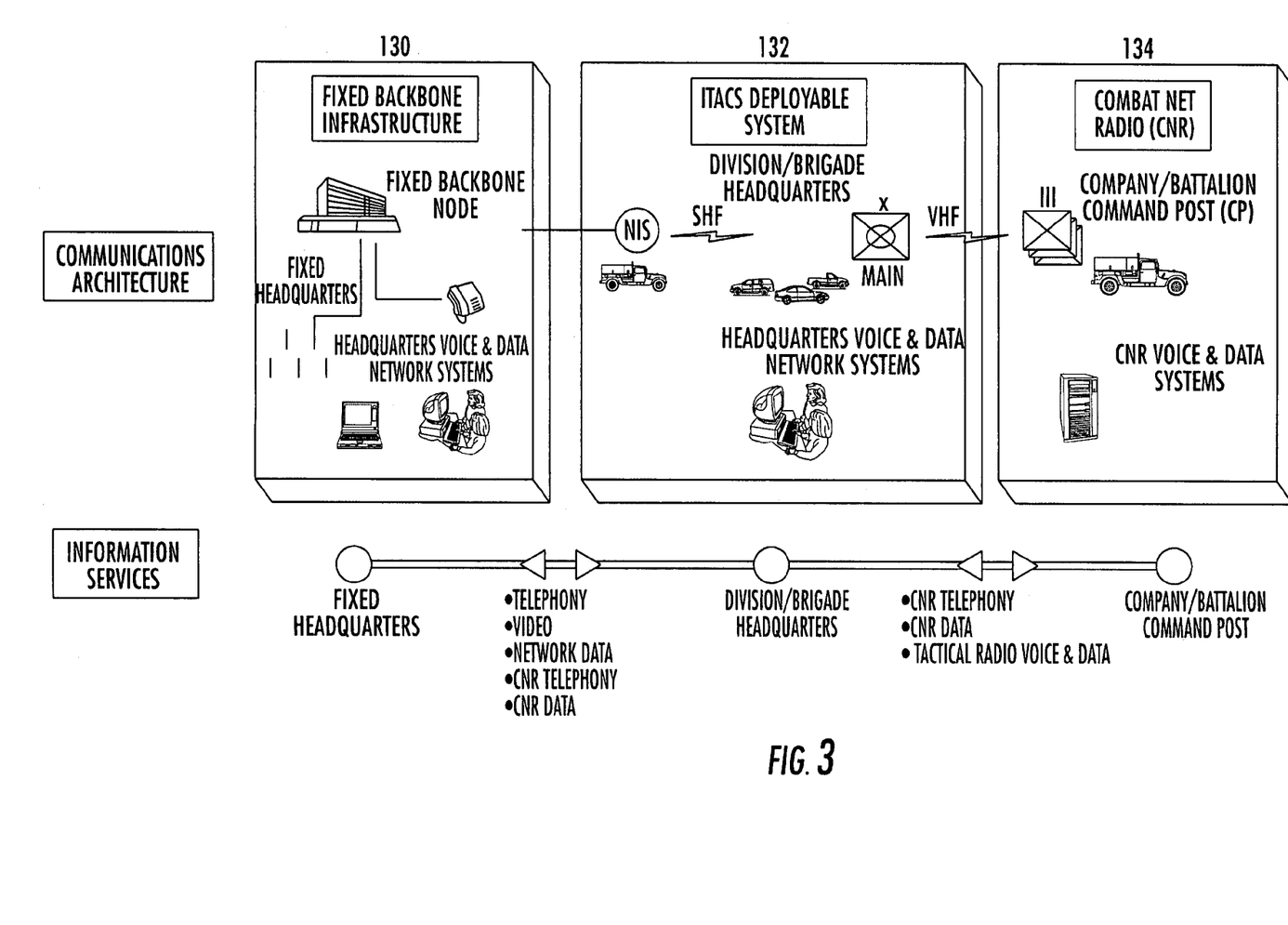
FIG. 3 is a block diagram showing a communications architecture and information services as a non-limiting example of different systems, infrastructure and Combat Net Radio (CNR) that can be used with the present invention.

FIGS. 2 and 3 show a type of network and communications architecture and information that could be used with the present invention. This non-limiting example for an application of the present invention is an Integrated Tactical Area Network System (ITACS) that is becoming more commonplace for tactical operations.

The ITACS system 100 shown in FIG. 2 is a communications system providing secure voice, data and video services to tactical users. Major components include a fixed backbone infrastructure 102 and ATM relay nodes 103 with a fiber link 104 to network interface stations 106, and tactical links such as an SHF or HF/VHF link to relay stations 108 and multipoint relay stations 110. Various Division 112, Brigade 114, Battalion 116 and Company/Platoon 118 headquarters/posts are shown with platoon/company/battalion command posts operative with combat net radio voice and data systems. The system 100 can use IP data and VOIP voice processing to provide full command, control, communications, computer and information ($C^4I$) facilities to both command and subordinate units. The typical ITACS system 100 can be designed for division and brigade level command users.

The system 100 uses a modular design and is able to develop and maintain a fully scalable mobile communications network that can be changed in near real time in order to meet the mission requirements. The deployment may vary from support of a full divisional deployment down to the deployment of a single brigade.

The use of IP as a packet-based technology allows a natural sharing of network service and true convergence of voice, data and network control traffic. The ITACS 100 provides seamless voice and data exchange across local and wide area networks, telecom networks, and combat net radio (CNR) communications networks. ITACS 100 also uses state-of-the-art commercial-off-the-shelf (COTS) equipment to connect to existing static communications infrastructure. The COTS hardware is very flexible and allows ITACS to interoperate with legacy communications systems with relative ease.

A typical ITACS deployment supports area communications to divisional and brigade headquarters. Each field headquarters can be supported by a mobile trunked network system, which can additionally be interconnected to existing static telecommunications network architectures.

A tactical High Capacity Line-of-Site (HCLOS) radio system (SHF) can support deployed infrastructure and ensure seamless interoperability. By using the HCLOS radios in a meshed network, multiple communications paths are established to provide the necessary redundancy for critical links between command centers and deployed assets.

A Combat Net Radio Interface (CNRI) supports the seamless interoperability of voice telephony and data services from deployed Combat Net Radio (CNR) users to staff users at divisional and brigade headquarters.

The communication nodes can be designed into a variety of platforms (wheeled, tracked, armoured, etc.) depending on the requirements of the customer. The main system configurations include a Network Interfacing Station (NIS) 106. This station 106 could have strategic WAN interface nodes (telephony/data); E1/T1, ATM, E3/T3, FXO, ISDN, DSL, serial; single point tactical microwave; bulk data encryption; VOIP telephony access point; Falcon II combat net radio suite (HF/VHF/UHF); and RF-6010 tactical network access hub.

Relay and Multi-Point Relay Stations (RS/MRS) 108, 110 could include tactical microwave radio relay station (HC-LOS); bulk data encryption (MRS only); data network switching/routing (MRS only); VOIP telephony access point (MRS only); Falcon II combat net radio suite (HF/VHF/UHF); and RF-6010 tactical network access hub (MRS only).

Any Division/Brigade/Battalion Command Station (DCS/BCS) 112, 114, 116 can include single/multi-point tactical microwave (HCLOS); bulk data encryption; data network switching/routing; VOIP telephony access point; Falcon II combat net radio suite (HF/VHF/UHF); RF-6010 tactical network access hub; and deployable command suite consisting of: (a) remotely deployable command tent (2 km fiber link); (b) command telephony switch (24/48 users); (C) $C^4$ data network facilities; (d) $C^2$ data facilities; (e) voice terminal equipment; (f) tactical video terminal equipment; (g) satellite communications terminal; and (h) support equipment.

The communications architecture and information services for an enlarged network system, including a number of combat net radios, is illustrated in FIG. 3. As illustrated the fixed backbone infrastructure 130 may include fixed headquarters and headquarters voice and data network systems and a fixed backbone node. The ITACS deployable system 132 can include the Division/Brigade headquarters communications with the network interface stations 106 communicating via SHF with Division/Brigade headquarters 112, 114 with voice and data network systems. These communicate via VHF to a combat net radio (CNR) and its Company/Battalion command post with combat net radio voice and data systems. The information services corresponding to the fixed backbone infrastructure 130 include a fixed headquarters with telephony, video, network data, combat net radio telephony and combat net radio data to the ITACS deployable system 132 and Division/Brigade headquarters which in turn is operable with a combat net radio 134 that is operable with combat net radio telephony, combat net radio data and tactical radio voice and data with the Company/Battalion command post.

The mobile radios of the present invention are operable with programmable cryptography modules, for example, in one non-limiting example, the Sierra and Sierra II programmable cryptographic modules manufactured and sold by Harris Corporation of Melbourne, Fla. The Sierra and Sierra II are programmable cryptographic modules operative as both a multimedia voice and data encryption module. Both modules are miniaturized printed wiring assemblies, and custom designed Application Specific Integrated Circuits (ASIC), which include supporting software. The modules are embedded in mobile radios and other voice and data communications equipment to encrypt classified information prior to transmission and storage.

The NSA-certified Sierra module is an embeddable encryption technology that combines the advantages of the government's high-grade security (Type 1) with the cost efficiency of a reprogrammable, commercially produced Type 3 and Type 4 encryption module. The Sierra module can assume multiple encryption personalities depending on the mission, and provide encryption/decryption functionality, digital voice processing (vocoding) and cryptographic key management support functions.

The Sierra module's software programmability provides a low cost migration path for future upgrades to embedded communications equipment without the logistics and cost burden normally associated with upgrading hardware. The module provides a user the capability to remove the Type 1 functionality, allowing the device to be downgraded from a CCI device to an unclassified device.

The Sierra module's small size, low power and high data rates make it an ideal choice for battery sensitive applications. It is ideally suited for military radios, APCO Project 25 radios, wireless LAN's, remote sensors, guided munitions, UAV's and other equipment requiring a low power, programmable solution. The Sierra module is available today as a complete compact module or as discrete parts for custom applications. The Sierra module has been fully NSA certified and successfully embedded in multiple applications (Motorola XTS™ 5000 Radio, BAE Systems JTRS 2C Radio, Harris SecNet 11 Secure Wireless LAN, key management modules, etc.).

The Sierra II module is a second product in the Sierra family and incorporates the features of the Sierra I module. It offers data rates greater than 300 Mbps and low power consumption suitable for battery powered applications, legacy and future algorithm support and advanced programmability. It can support the requirements of the Joint Tactical Radio System (JTRS) and NSA's Crypto Modernization Program, including the requirement for programmability. The software programmability provides a low cost migration path for future upgrades to embedded communications equipment without the logistics and cost burden normally associated with upgrading hardware. These encryption modules have a small size, exhibit low power consumption, and have high data rates, making the modules an ideal choice for battery powered applications. They are especially suited for JTRS applications, military radios, wireless local area networks (LAN's), remote sensors, guided munitions, UAV's and other equipment requiring a low powered, programmable solution. The Sierra family of modules can be used with the cluster I cryptographic module and could create embeddable security modules for a cluster V platform.

The Sierra family of encryption modules has various cryptographic and other features. They are operable with Type 1, 3 and 4 cryptographic algorithms.

Type 1 cryptographic algorithms include:
a) BATON/MEDLEY;
b) SAVILLE/PADSTONE;
c) KEESEE/CRAYON/WALBURN;
d) GOODSPEED;
e) ACCORDION;
f) FIREFLY/Enhanced FIREFLY; and
g) JOSEKI Decrypt.

Type 3 cryptographic algorithms include:
a) DES, Triple DES;
b) AES;
c) Digital Signature Standard (DSS); and
d) Secure Hash Algorithm (SHA).

Type 4 cryptographic algorithms include the CITADEL cryptographic engine that uses cryptographic algorithms based on a mixed-mode, arithmetic block cipher. It can provide half-duplex encryption and decryption at throughput rates up to 5 Mbps. It can process serial or parallel unencrypted [cipher text-CT)] data. Interfaces are 3.3V and 5V CMOS compatible. The algorithm can be customized.

Other algorithms can be added later. These encryption modules also have key management, which includes:
a) SARK/PARK (KY-57, KYV-5 and KG-84A/C OTAR);
b) DS-101 and DS-102 Key Fill;
c) SINCGARS Mode 2/3 Fill; and
d) Benign Key/Benign Fill.

Data rates can be up to 300 Mbps (depending on the mode), and the modules are available as ASIC and/or another module. A programmable cryptographic ASIC is available in two packages for various embedded applications. Package 1 is 280-ball μGBGA (16 mm×16 mm), and package 2 is 608-ball BGA (31 mm×31 mm).

The operating temperature for these modules is about −40 degrees to +85 degrees C., and the supply voltage is about 1.8V (ASIC) or 3.3V (module). It has low power draw, making them especially applicable for battery powered applications. These modules are field software reprogrammable, have cryptographic bypass, and are non-CCI prior to Type 1 programming. The modules are designed to protect voice/data traffic up to TS/SCI.

The modules can be used in different applications such as: (a) all JTRS radio products (e.g., vehicular, manportable, handheld, airborne, etc.); (b) handheld and mobile law enforcement (battery powered) radios; (c) guided munitions and UAV applications; (d) telemetry and military sensor systems; (e) network interface cards and IP security products (HAIRE-compliant); (f) secure wireless networks (Harris SecNet products; (g) homeland security applications; and (h) next generation key management modules.

An example of a cryptographic circuit that can be used with modification and upgraded by the present invention is the Sierra™ cryptography module, for example, also shown in FIG. 9 in U.S. published patent application no. 2002/0095594, the disclosure which is incorporated by reference in its entirety. The cryptography processor can be a Palisades ASIC, for example, as in the Sierra cryptography module. The cryptography circuit could include RAM and associated back-up battery and a field programmable gate array that can be programmed to produce various devices and logic blocks as appreciated by those skilled in the art.

FIGS. 7-9 show block diagrams of networked mobile radios and repeaters as specific examples of the present invention. As shown in FIG. 7, radio A is operable to transmit and receive with frequency hopping hopsets with a repeater, which receives/transmits on the reverse frequencies compared to the mobile radio outstations, which of course, are operable with the two frequency hopping hopsets. Radio B, of course, is operable as a two frequency hopping simplex radio. The repeater includes first and second radio transceiver circuits TR1, TR2, which can receive on respective first and second frequency hopping hopsets. FIG. 8 shows how the repeater of the present invention can extend the range of a typical mobile radio C1 to be operable with chosen mobile radio C2 through C5. The mobile radio C1 transmits on the first frequency hopping hopset while the repeater transmits on the second frequency hopping hopset such that the mobile radios C2 through C5 receive on that second frequency hopping hopset.

FIG. 9 shows use of two mobile radios L1 and L2 interlinked to allow interlinking of two repeaters A and B using a dedicated single frequency hopping hopset simplex radio link. Repeater A includes transceiver circuits TR1 and TR2 and Repeater B includes transceiver circuits TR1' and TR2' to allow transmission and receiving of communication signals on the respective first and second frequency hopping hopsets. As illustrated, the use of the interlink allows five different frequency hopping hopsets to be used. The interlink could be formed by two repeaters directly connected to each other.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating between "N" number of mobile radios comprising:
   first and second repeaters that are operative for transmitting and receiving communications signals on different frequency hopping hopsets; and
   "N" mobile radios that receive a communications signal from repeaters on a first frequency hopping hopset and transmit a communications signal to the respective repeater on a second frequency hopping hopset to reduce the number of radio paths participating in all-informed communications and enhance the probability that the "N" number of mobile stations may participate in a conversation with each other, wherein two mobile radios can be interlinked together using first and second repeaters and a dedicated single frequency hopping simplex communication.

2. A system according to claim 1, wherein said mobile radio comprises one of a handheld or manpack radio.

3. A system according to claim 1, wherein said mobile radio is operative as a combat net radio outstation within a combat net radio communications network.

4. A system according to claim 1, said mobile radio and repeater are operative for transmitting and receiving communications signals with one of Single-Channel Ground and Airborne System (SINCGARS) or Quicklook frequency hopping protocol.

5. A system according to claim 1, wherein said mobile radio is operative as a repeater.

6. A system according to claim 1, wherein said repeater comprises a mobile radio and includes a buffer for buffering communications signals.

7. A system according to claim 1, wherein said mobile radio is operative for transmitting communications signals having an identification for another mobile radio.

8. A system according to claim 1, wherein said communications signal comprises encrypted data.

9. A system for communicating between "N" number of mobile radios comprising:
   a combat net radio communications network having "N" mobile radios and each operative for transmitting and receiving communications signals along different transmit and receive frequency hopping hopsets; and
   first and second repeaters in communication with the "N" mobile radios contained within the combat net radio communications network and operative for communicating with the mobile radios on different frequency hoping hopsets such that mobile radios communicate to each other only through the repeater to reduce the number of radio paths participating in all-informed communications and enhance the probability that the "N" number of mobile stations may participate in a conversation with each other, wherein two mobile radios can be interlinked together using first and second repeaters and a dedicated single frequency hopping simplex communication.

10. A system according to claim 9, and further comprising another repeater and an interlink between repeaters and contained within said combat net radio communications network for enlarging the number of frequency hopping hopsets that can be used within the combat net radio communications network.

11. A system according to claim 9, wherein each mobile radio comprises one of a handheld or manpack radio.

12. A system according to claim 9, wherein each mobile radio and repeater are operative for transmitting and receiving communications signals with one of Single-Channel Ground and Airborne System (SINCGARS) or Quicklook frequency hopping protocol.

13. A system according to claim 9, wherein each mobile radio is operative as a repeater.

14. A system according to claim 9, wherein said repeater comprises a mobile radio and includes a buffer for buffering a communications signal.

15. A system according to claim 9, wherein each mobile radio is operative for transmitting communications signals having an identification for another mobile radio.

16. A system according to claim 9, wherein said communications signal comprises encrypted data.

17. A method of communicating between "N" number of mobile radios, which comprises:
   receiving within "N" number of mobile radios a communications signal that had been transmitted from a repeater along a first frequency hopping hopset;
   transmitting a communications signal from the "N" number of mobile radios to the repeater on a second frequency hopping hopset different from the first frequency hopping hopset to reduce the number of radio paths participating in all-informed communications and enhance the probability that the "N" number of mobile stations may participate in a conversation with each other; and interlinking together two mobile radios using first and second repeaters and a dedicated single frequency hopping simplex communications.

18. A method according to claim 17, wherein the mobile radio comprises one of a handheld or manpack mobile radio.

19. A method according to claim 17, which further comprises transmitting the communications signals between mobile radios as combat net radio outstations in communication with the repeater within a combat net radio communications network.

20. A method according to claim 17, which further comprises transmitting and receiving communications signals on frequency hopping waveforms in accordance with one of Single-Channel Ground and Airborne System (SINCGARS) or Quicklook frequency hopping protocol.

21. A method according to claim 17, which further comprises transmitting and receiving communications signals to and from a repeater that is operative as a mobile radio.

22. A method according to claim 17, which further comprises communicating an identification within the communications signal identifying another mobile radio.

23. A method according to claim 17, which further comprises buffering the communications signal within a mobile radio operative as a repeater.

24. A method according to claim 17, which further comprises encrypting data within the communications signal.

* * * * *

UNITED STATES PATENT AND TRADEMARK OFFICE
CERTIFICATE OF CORRECTION

PATENT NO. : 7,233,770 B2  Page 1 of 1
APPLICATION NO. : 11/074357
DATED : June 19, 2007
INVENTOR(S) : Williamson et al.

It is certified that error appears in the above-identified patent and that said Letters Patent is hereby corrected as shown below:

Column 2, Line 6     Delete: " inventions "
Insert: -- invention --

Column 5, Line 55     Delete: "wile "
Insert: -- while --

Column 6, Line 52     Delete: " air "
Insert: -- area --

Column 8, Line 26     Delete: " Line-of-Site "
Insert: -- Line-of-Sight --

Signed and Sealed this

Sixteenth Day of October, 2007

JON W. DUDAS
*Director of the United States Patent and Trademark Office*